Patented Jan. 12, 1954

2,666,051

UNITED STATES PATENT OFFICE 2,666,051

N-ACYL DERIVATIVES OF IMINODIBENZYL

Franz Häfliger and Walter Schindler, Basel, Switzerland, assignor to J. R. Geigy A. G., Basel, Switzerland, a Swiss firm No Drawing. Application July 9, 1952, Serial No. 298,010

Claims priority, application Switzerland July 11, 1951

6 Claims. (Cl. 260—239)

This invention concerns new N-acyl derivatives of iminodibenzyl. It has been found that these compounds of the general formula:

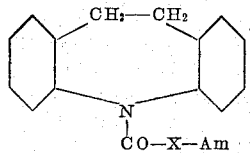

wherein

X represents a low molecular divalent saturated aliphatic radical and

Am represents the radical of a secondary amine consisting of NH and two lower aliphatic hydrocarbon radicals, the radical of a tri-(lower alkyl)-alkylene diamine, or the radical of an alkylene imine having 5-6 ring members, have interesting pharmacological properties especially a strong local anaesthetic activity, and some of them also have a spasmolytic effect.

The new compounds can be produced by reacting an N-(halogen-alkanoyl)-iminodibenzyl with a secondary amine consisting of NH and two lower aliphatic hydrocarbon radicals, or with a tri-(lower alkyl)-alkylene diamine or with an alkylene imine having 5-6 ring members (pyrrolidine, piperidine or their C-alkyl substitution products).

The reaction can take place in inert solvents such as e. g. benzene or homologues thereof. To bind the hydrohalic acid which is freed during the reaction, an excess of the amine used for the reaction can be used. Also an organic tertiary base such as dimethyl aniline or pyridine or inorganic acid binding agents such as sodium or potassium carbonate can be used for this purpose.

The N-(halogen-alkanoyl)-iminodibenzyl necessary as starting materials can easily be produced by acylating iminodibenzyl with halogen fatty acid halides or also the corresponding anhydrides in the presence or absence of e. g. pyridine, dimethyl aniline, etc.

As N - (halogen - alkanoyl) - iminodibenzyls, there can be employed e. g.: Chloracetyl-, bromacetyl-, α-chloropropionyl-, α-bromopropionyl, α-bromobutyryl-, α-bromo-isobutyryl-, α-bromovaleryl-, α-bromoisovaleryl-, α-bromocaproyl-iminodibenzyl, β-chloropropionyl-, β-bromopropionyl-, β-chlorobutyryl-, β-bromobutryl-, β-chloroisobutyryl-, β-bromo-isobutyryl-, β-bromovaleryl-, β-bromo-isovaleryl-iminodibenzyl, γ-chlorobutyryl-, γ-chlorovaleryl-iminodibenzyl, δ-chlorovaleryl-iminodibenzyl, etc.

These N-(halogen - alkanoyl)-iminodibenzyls can be reacted for example with dimethylamine, methylethylamine, diethylamine, dipropylamine, di-isopropylamine, dibutyl-, and diamylamines, methylallylamine, diallylamine, trimethyl-ethylene diamine, triethylethylene diamine, pyrrolidine, piperidene or C-alkylated pyrrolidines or piperidines.

The new compounds form salts, some of which are soluble in water with a nearly neutral reaction, with inorganic or organic acids such as e. g. hydrochloric acid, sulphuric acid, phosphoric acid, tartaric acid, citric acid and salicylic acid.

The following examples further illustrate the production of the new compounds. Where not otherwise stated, parts are given as parts by weight and the relationship of parts by weight to parts by volume is that of grammes to cubic centimetres. The temperatures are in degrees centigrade.

Example 1

9.8 parts of iminodibenzyl are dissolved in 50 parts by volume of abs. benzene. 12 parts of α-bromopropionyl bromide are added dropwise to this solution and then the whole is boiled for 10 hours under reflux. The solvent is distilled off in the vacuum whereupon the N-(α-bromopropionyl)-iminodibenzyl crystallises out. It can be recrystallised from e. g. abs. ether. M. P. 118–119°.

This starting material can also be produced for example in the following manner:

19 parts of iminodibenzyl are dissolved in 50 parts by volume of abs. benzene and 15 parts of pyridine are added. 12 parts of α-bromopropionyl bromide are slowly dropped in while cooling and on completion of the dropwise addition, the whole is kept boiling for 1 hour. The excess α-bromopropionyl chloride is then decomposed with water and the benzene solution is thoroughly shaken out twice with diluted hydrochloric acid. It is then washed neutral, dried and evaporated whereupon the N-(α-bromopropionyl)-iminodibenzyl crystallises out.

16 parts of N-(α-bromopropionyl)-iminodibenzyl are dissolved in 50 parts by volume of abs. benzene and 40 parts by volume of diethylamine are added, after which the whole is boiled under reflux for 20 hours. After cooling, the liquid is thoroughly washed with water and the basic portions are extracted from the benzene solution with diluted hydrochloric acid. The acid extracts are made alkaline and the base is taken up in ether. After drying and evaporating off the ether, N-(α-diethylamino-propionyl)-iminodibenzyl is obtained. M. P. 90°.

In the same way and using piperidene instead of diethylamine, N-(α-piperidino-propionyl)-iminodibenzyl is obtained. M. P. 109–110°.

N - [α - (N' - dimethylaminoethyl-N'-methylamino)-propionyl]-iminodibenzyl and N-α-(pyrrolidino-propionyl)-iminodibenzyl can be produced in the same manner and, starting from N-(α-bromo-butyryl)-iminodibenzyl, also N-(α-dimethylamino-butyryl) - iminodibenzyl, N-[α(-diethylaminoethyl - N' - ethyl - amino)-butyryl]-iminodibenzyl and N-(α-piperidino-butyryl)-iminodibenzyl.

*Example 2*

9.8 parts of iminodibenzyl are dissolved in 50 parts by volume of abs. benzene and 6 parts of chloracetyl chloride are added dropwise. The whole is boiled under reflux for 4 hours, the solvent is distilled off whereupon the N-chloracetyl-iminodibenzyl crystallises out. M. P. 92–93°.

The N-chloracetyl-iminodibenzyl so obtained is allowed to stand for 12 hours with 6 parts of dimethylamine which are dissolved in 25 parts of benzene. Then it is boiled for 1 hour under reflux. The liquid is washed with water and the basic portions are extracted from the benzene solution with diluted hydrochloric acid. The hydrochloric acid solution is made alkaline, the base which precipitates is taken up in ether, the ethereal solution is dried and the ether is evaporated off. N-(dimethylaminoacetyl)-iminodibenzyl is obtained as an oil, B. P.$_{0.4}$ 176–177°. The hydrochloride melts at 236–238°.

On reacting with diethylamine in an analogous manner, N-diethylamino-acetyl-iminodibenzyl is obtained, B. P.$_{0.1}$ 182–183°. M. P. of hydrochloride 226–228°. An analogous reaction with triethyl-ethylene diamine results in N-(N'-diethylaminoethyl - N' - ethylamino - acetyl)-iminodibenzyl. B. P.$_{0.2}$ 206–207°.

Further compounds which can be produced by reacting N-chloracetyl-iminodibenzyl with the corresponding amines are N-diallylaminoacetyl-iminodibenzyl (B. P.$_{0.05}$ 189°), N-dibutyl-aminoacetyl-iminodibenzyl and N-piperidinoacetyl-iminodibenzyl.

If N-(α-bromopropionyl)-iminodibenzyl is reacted in an analogous manner with a benzene solution of dimethylamine, N-(α-dimethylamino-propionyl)-iminodibenzyl is obtained, M. P. 109–110°.

*Example 3*

20 parts of iminodibenzyl are dissolved in 50 parts by volume of abs. benzene and 18 parts of β-bromopropionyl chloride are added. The whole is heated under reflux until no more hydrogen chloride is generated, which is for about 4 hours. After cooling, the liquid is shaken out with water and sodium bicarbonate. The benzene solution is dried and evaporated which leaves a residue of N-(β-bromopropionyl)-iminodibenzyl. It can be recrystallised from abs. ether and melts at 110°.

This raw product is dissolved in 50 parts by volume of abs. benzene and 40 parts by volume of about a 10% solution of dimethylamine in benzene are added. The mixture is allowed to stand for 16 hours at room temperature and then is boiled for 2 hours under reflux. After cooling, the basic portions are extracted from the benzene solution with diluted hydrochloric acid, the hydrochloric acid solution is made alkaline with potassium carbonate and ethered out.

After drying and evaporating the ether, the residue is distilled in a high vacuum. At 0.2 mm. pressure the N-(β-dimethylamino-propionyl)-iminodibenzyl boils at 195–197°. The hydrochloride melts after crystallisation from isopropyl alcohol at 168–170°.

In the same way, using diethylamine instead of dimethylamine, N-(β-diethylamino-propionyl)-iminodibenzyl is obtained. The hydrochloride melts at 179–180° (crystallised from isopropyl alcohol).

N-(β-piperidino-propionyl) - iminodibenzyl, N-(β-diallylamino-propionyl)-iminodibenzyl and N-[β-(N'-diethylaminoethyl-N'-ethylamino) - propionyl]-iminodibenzyl are obtained by reacting piperidine, diallylamine or triethyl-ethylene diamine in an analogous manner with N-(β-bromopropionyl)-iminodibenzyl.

In the same way, by reacting N-(β-bromobutyryl)-iminodibenzyl with dimethylamine, pyrrolidine or trimethyl-ethylene diamine, N-(β-dimethylamino - butyryl) - iminodibenzyl, N-(β-pyrrolidino-butyryl)-iminodibenzyl and N-[β-(N' - dimethylamino - ethyl - N'-methylamino)-butyryl]-iminodibenzyl can be obtained.

What we claim is:

1. An N-acyl derivative of iminodibenzyl corresponding to the formula:

$$\begin{array}{c}\text{CH}_2\text{—CH}_2\\ \text{[iminodibenzyl ring system]}\\ \text{N}\\ \text{CO—CH—Am}\\ \text{R}\end{array}$$

wherein

R represents a member selected from the group consisting of hydrogen and lower alkyl radicals and Am represents a member selected from the group consisting of the radical of a secondary amine consisting of NH and two lower aliphatic hydrocarbon radicals, the radical of a tri-(lower alkyl)-ethylene diamine, and the radical of an alkylene imine having 5–6 ring members.

2. N-(dimethylaminoacetyl)-iminodibenzyl.

3. N-(α - diethylamino - propionyl) - iminodibenzyl.

4. N-(α-piperidino-propionyl)-iminodibenzyl.

5. N-(α-dimethylamino-propionyl) - iminodibenzyl.

6. N-(N'-diethylaminoethyl - N'-ethyl-aminoacetyl)-iminodibenzyl.

FRANZ HÄFLIGER.
WALTER SCHINDLER.

References Cited in the file of this patent

UNITED STATES PATENTS

| Number | Name | Date |
|---|---|---|
| 2,554,736 | Haefliger et al. | May 29, 1951 |

OTHER REFERENCES

Thiele et al., Beilstein (Handbuch, 4th ed.) vol. 20, p. 447 (1935).